United States Patent

[11] 3,585,602

[72] Inventor Wolf Herold
Ay(Iller), Germany
[21] Appl. No. 869,261
[22] Filed Oct. 24, 1969
[45] Patented June 15, 1971
[73] Assignee Telefunken Patentverwertungsgesellschaft m.b.H.
Ulm (Danube) Germany
[32] Priority Oct. 24, 1968
[33] Germany
[31] P 18 04 870.9

[54] PHASE COMPARING CLOCK PULSE GENERATING CIRCUIT FOR A RECEIVER OF A MULTIPLEX TRANSMISSION SYSTEM
4 Claims, 12 Drawing Figs.

[52] U.S. Cl. .......... 340/172, 340/170
[51] Int. Cl. .......... H04q 9/14, H04q 11/00
[50] Field of Search .......... 340/172, 170

[56] References Cited
UNITED STATES PATENTS
2,721,308 10/1955 Levy .......... 340/172 UX

*Primary Examiner*—Harold I. Pitts
*Attorney*—Spencer and Kaye

ABSTRACT: A clock pulse generating circuit provided at the receiver of a multiplex data transmission system for generating a clock pulse signal for the receiver from the combined signal transmitted over the multiplex system. The circuit is arranged to compare the phase of the output of a local clock pulse generator with the phase of a signal representing the algebraic product of the combined signal and a code signal derived from, and synchronized with, the output of the clock pulse generator. The circuit varies the output of the clock pulse generator in response to the result of the comparison and in a direction to reduce the phase difference between the signals being compared.

PATENTED JUN 1 5 1971 3,585,602

Inventor:
Wolf Herold

BY Spencer & Kaye
ATTORNEYS.

PHASE COMPARING CLOCK PULSE GENERATING CIRCUIT FOR A RECEIVER OF A MULTIPLEX TRANSMISSION SYSTEM

BACKGROUND OF THE INVENTION

The present invention relates to a circuit arrangement for producing the bit timing and/or frame timing from a combined signal formed by the simultaneous transmission of a plurality of individual data transmissions over a common transmission path wherein there are also transmitted addresses which consist of binary code words of identical length designating the receiver and/or transmitter for each individual transmission and which contain the date to be transmitted in the form of a modulation of their amplitude.

In data transmission systems in which the data is in the form of binary code words, it is necessary to synchronize the receiver with the transmitted word bit timing. If a plurality of data transmissions are applied to a common transmission path according to a time-division multiplex or time-function multiplex technique, it is additionally necessary to also determine the frame timing, i.e. the time interval during which every transmitter sends a message element, at the receiver end.

Transmission according to the time-function multiplex technique occurs as follows:

All participants in the data transmission are transmitting or receiving simultaneously. The information is transmitted, for example, in that an address also consisting of binary code words and containing the information identifying the sender and/or receiver is modulated, e.g., by pulse amplitude modulation, on the basis of the data.

The data destined for an individual receiver is selected out of the composite signal by a technique whereby the receiver correlates the signal with its own address combination and takes its associated data from the autocorrelation function.

This correlation produces, in addition to the autocorrelation product, a crosscorrelation produce which appears in the form of noise.

It is necessary that the autocorrelation product be as large as possible, and the crosscorrelation product as small as possible This can be accomplished when all transmitted addresses represent orthogonal, i.e. statistically independent, time functions with respect to one another. In this case, the autocorrelation function becomes a maximum at the moment of receipt of a sample destined for that receiver and the crosscorrelation function becomes zero.

SUMMARY OF THE INVENTION

It is a primary object of the present invention to provide a simple circuit for a data transmission system operating according to the above principles which permits the bit timing and/or the frame timing to be derived from the combined signal.

These and other objects according to the invention are achieved by the provision of clock pulse generating means for use in a data transmission system which transmits a combined signal composed of a plurality of independent information signals over a common transmission, each signal being constituted by a cyclically repeated binary address code word which is amplitude modulated in accordance with the information which it is to contain, every information signal having a binary code ward of the same length as those of the other information signals and having its code words transmitted in synchronism with those of the other information signals. The clock pulse generating means are composed of voltage controlled oscillator means for producing, at its output, the desired clock pulses, phase comparator means having two inputs and an output at which appears a voltage representative of the phase difference between signals applied to its inputs, the output of the oscillator means being connected to one of the inputs, and filter means connected between the output of the phase comparator means and the oscillator means for providing a voltage which controls the frequency of the output pulses from the oscillator means in a direction to reduce the phase difference between the signals at the comparator means inputs. The clock pulse generating means further include the generator means having an input connected to the output of the oscillator means for producing an output pulse pattern whose frequency is controlled by the frequency of the pulses produced by the oscillator means, the pattern being composed of positive amplitude portions during the times when all of the code words have positive amplitudes, negative amplitude portions during the times when all of the code words have negative amplitudes, and zero amplitude portions at all other times, multiplier means having an output, a first input connected to receive the combined signal, and a second input connected to the output of the code generator means and threshold limiting means connected between the multiplier means output and the other of the inputs of the phase comparator means for passing only signals which exceed a predetermined amplitude.

DESCRIPTION OF THE PREFERRED EMBODIMENTS

Figures 1A, 1B:
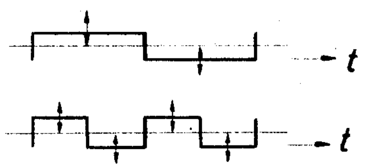
FIGS. 1*a*—1*d* are pulse diagrams used in explaining the principles of the present invention.
Figure 1C:
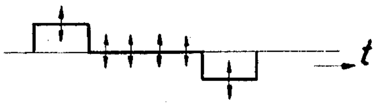

FIGS. 1*a* and 1*b* show the simple case of two mutually orthogonal functions. The arrows indicate that the pulse amplitude is modulated as a function of the data being transmitted. The degree of modulation is here so selected that no loss of data can occur due to a reversal in the binary signal polarities. FIG. 1*c* illustrates the signal formed by combining the two modulated signals, which combined signal is also amplitude-modulated.

In the time periods where the amplitude of the unmodulated components of the combined signal is zero due to the cancellation of the two contributing time functions, it is possible, under certain circumstances, that a slight amplitude variation will appear in dependence on the momentary amplitude modulation of the two time functions. The waveform of the combined signal shown in FIG. 1*c* is thus highly idealized; in reality the amplitude modulations produce fluctuations so that it is not possible to derive the clock pulse from the combined signal, per se, since the average clock frequency is not contained in the combined signal. It should be noted that a characteristic waveform of the combined signal illustrated in FIG. 1*c* will become evident even when a large number of orthogonal time functions are combined.

If, now, one of the participating time functions is missing, the same characteristic waveform will be produced, but it will be slightly modified. The example of FIGS. 1*a*—1*c* serves to illustrate this as follows: The curve of FIG. 1*c* is characterized by a positive bit pattern at the beginning of an address signal period and a negative bit pattern at the end. If, now, one of the two components illustrated in FIGS. 1*a* and 1*b* is missing, a pulse pattern, or waveform, results which exhibits the same properties but follows a different path. If, now, the signal timing, or repetition rate, is regulated simply on the basis of the two above-mentioned properties, such timing can be derived even if one of the two time functions is missing. By extension, the same is true when a plurality of time functions are present in a combined signal. Since the type of time function is known, the waveform of the combined signal is also known.

Figure 2:
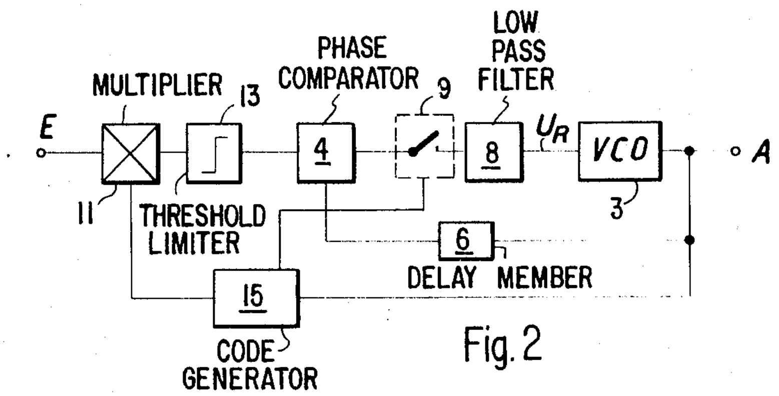
FIG. 2 is a circuit diagram of one preferred embodiment of the invention.

FIG. 2 shows a simple circuit according to the invention with which it is possible to derive the bit rate or the frame rate from the combined signal. The two mentioned values are related to one another in that the bit rate is an integral multiple of the frame rate. This circuit includes a voltage controlled oscillator (VCO) 3 whose frequency can be controlled by a control voltage $U_R$ to produce a square wave output signal at the desired clock pulse rate at the output A of the circuit. Initially, the oscillator 3 delivers a frequency determined only by the characteristics of the oscillator itself; these characteristics are chosen in that manner, that the delivered frequency is nearly the correct one which can be expected. The control voltage is generated in a phase comparator 4 which compares the phase of the output signal from the oscillator 3, if necessary after being delayed in a delay member 6, with the phase of the incoming combined signal delivered to circuit input E. The input signal is not directly fed to the phase comparator 4, but is first processed in a manner which will be described in detail below. Since the signals to be compared are pulse trains, the phase comparator 4 may be constructed in a known manner as a bistable flip-flop. The output voltage from this flip-flop is fed to the oscillator 3 through a low-pass filter 8 which derives the control voltage $U_R$ for the oscillator from the voltage pulses at the output of the flip-flop. The switch 9 shown in the drawing between components 4 and 8 is not absolutely necessary, but its purpose will be described below.

From input E the combined signal goes to a multiplier 11 whose output is connected with the phase comparison member via a threshold limiter stage 13. To the output A of the oscillator there is connected a code generator 15 whose output is connected with the second input of the multiplier 11.

Figure 1D:
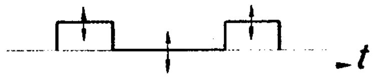

The code generator 15 produces a bit sequence at a frequency determined by the oscillator 3 and with the same configuration as the waveform of the signal fed in at the input E, but without its variation due to modulation and with possible elimination of some of its functions. When the applied signals have the form shown in FIG. 1, the code generator 15 emits a time function having, in theory, the ideal waveform shown in FIG. 1*c*.

The code generator is built up as a feedback shift-register; shaft registers of this type are described in, e.g. W. W. Peterson, Error correcting codes, MIT-press 1961. The oscillator 3 controls the code generator 15 in that its output pulse train is used as clock pulse producing the sequence of bits which form each address.

The time function generated by the code generator 15 will be called the clock pulse pattern, or waveform. This clock pulse pattern is multiplied in the multiplier 11 with the combined signal. If the prerequisite that the clock frequency of the combined signal be identical with the clock frequency of the clock pattern produced by oscillator 3 is satisfied, the multiplier 11 will emit a time function which has the waveform shown in FIG. 1*d* when the combined signal has the form shown in FIG. 1*c*. The indicated amplitude fluctuations are removed by the limiter 13.

Thus a demodulated input signal is fed into the phase comparator 4 where its phase is compared with the output signal from the oscillator 3. If the phases compared by the comparator coincide, no control voltage is fed to the oscillator VCO. Otherwise, the control voltage $U_R$ is made either positive or negative to vary the output frequency from oscillator 3 in a direction to restore the desired phase relationship.

Figure 5:
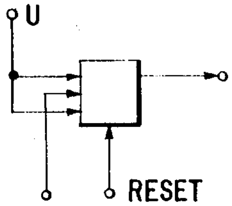
FIGS. 5 and 6*a*—6*d* concern to further explanations of the phase comparator 4.
Figures 6A, 6B, 6C, 6D:
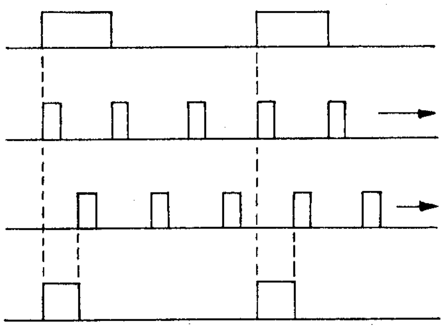

The comparator 4 is built up as a bistable flip-flop of the IK-type, as shown in FIG. 5. There are four inputs: two of them are connected to a voltage source U, thus inverting logic value delivered to the third input. Positive Signals applied to the fourth input "Reset" reverse the output value. FIG. 6 show the pulse diagrams: 6*a* is identical to 1*d*. 6*b* are the output pulses of oscillator 3, 6*c* the same pulses delayed by $\pi$. 6*d* shows the output signals of comparator 4. The DC-component (i.e. the surface integral) is determined by the low-pass filter 8 and controls the oscillator 3. The arrows in FIGS. 6*b* and 6*c* indicate that the output pulses of oscillator 3 may vary concerning to their frequency, i.e. their phase related to the pulses of FIG. 6*a*. By this, the DC-component of the pulses in FIG. 6*d* varies, too.

The delay member 6 makes it possible to shift the output pulses from oscillator 3 to center them on the combined signal pulses whenever the output pulses of the oscillator 3 are narrower, i.e. of shorter duration, than the pulses of the combined signal. Such shifting is advantageous because it aids the operation of the phase comparator 4. If the oscillator 3 produces a clock frequency different from that of the combined signal before synchronization, the delay of the output pulses of the oscillator with respect to the pulses of the combined signal after the regulating process will be the delay produced by member 6 and $\alpha$. The error angle $\alpha$ keeps the oscillator at the new frequency.

The angle $\alpha$ is the "residual phase" of a phase-locked-loop, as it is described, e.g., in F. Gardner, Phaselock Techniques, J. Wiley Sons, NY, chapter IV.

Figure 3:
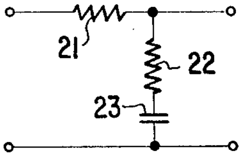
FIG. 3 is a circuit diagram of one component of the arrangement of FIG. 2.

The switch 9 shown in FIG. 2 between the phase comparator 4 and the low-pass filter 8 serves the following purpose: During the period when the combined signal has a zero amplitude, only the output pulses of oscillator 3 are fed to the phase comparator 4 and could cause the control voltage $U_R$ to run away in an undesired direction. If during such time period the switch is opened, the voltage $U_R$ will remain at its last value, due to the long time constant of the low-pass filter 8. For example, if filter 8 is constructed, as shown in FIG. 3, of a series resistor 21 and a series arrangement of a resistor 22 and a capacitor 23 connected in a shunt branch, the capacitor 23 the low-pass filter cannot discharge very rapidly through the very high resistance input of oscillator 3.

Figure 4:
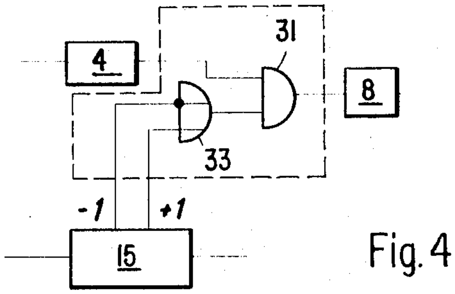
FIG. 4 is a circuit diagram of a portion of a modified embodiment of the invention.

The switch can be controlled by code generator 15 and may be constructed as shown in FIG. 4. An AND gate 31 passes the output of phase comparator 4 to low-pass filter 8 only when a positive signal is applied also to its second input. This positive signal is applied through an ORNOT gate 33 provided with two inputs one of which is connected with the output of code generator 15 having a positive potential when the code generator produces the positive portion of the clock pattern and the other of which is negated and connected to the corresponding generator negative output. When the code generator produces a portion of the clock pattern having a zero voltage, ORNOT gate 33 does not produce an output for activating gate 31 and the connection between elements 4 and 8 is interrupted.

It can be imagined that, for certain orthogonal functions, there appears a combined signal whose cycles overlap due to displacements in time which are smaller than one time frame. Such signals are ambiguous for the circuit according to the present invention and can not be evaluated.

It will be understood that the above description of the present invention is susceptible to various modifications, changes and adaptations.

I claim:

1. Clock pulse generating means for use in a data transmission system which transmits a combined signal composed of a plurality of independent information signals over a common transmission, each signal being constituted by a cyclically repeated binary address code word which is amplitude modulated in accordance with the information which it is to contain, every information signal having a binary code word of constant length as those of the other information signals and having its code words transmitted in synchronism with those of the other information signals, said clock pulse generating means comprising, in combination:

a. voltage controlled oscillator means for producing, at its output, the desired clock pulses;

b. phase comparator means having two inputs and an output at which appears a voltage representative of the phase difference between signals applied to its inputs, the output of said oscillator means being connected to one of said inputs;

c. filter means connected between the output of said phase comparator means and said oscillator means for providing a voltage which controls the frequency of the output pulses from said oscillator means in a direction to reduce the phase difference between the signals at said comparator means inputs;

d. code generator means having an input connected to the output of said oscillator means for producing an output pulse pattern whose frequency is controlled by the frequency of the pulses produced by said oscillator means, the pattern being composed of positive amplitude portions during the times when all of the code words have positive amplitudes, negative amplitude portions during the times when all of the code words have negative amplitudes, and zero amplitude portions at all other times;

e. multiplier means having an output, a first input connected to receive the combined signal, and a second input connected to the output of said code generator means; and f. threshold limiting means connected between said multiplier means output and the other of said inputs of said phase comparator means for passing only signals which exceed a predetermined amplitude.

2. An arrangement as defined in claim 1 wherein the code word of each information signal constitute a time function which is orthogonal to the time function constituting the code word of every other information signal.

3. An arrangement as defined in claim 1 further comprising time delay means connected between the output of said oscillator means and said one of said inputs of said phase comparator means.

4. An arrangement as defined in claim 1 further comprising switch means connected in series with said filter means for opening the circuit between said filter means and said phase comparator means, and thus causing the output of said filter means to remain constant, during those time periods when the voltage applied to said threshold limiter is below its threshold value.

UNITED STATES PATENT OFFICE
CERTIFICATE OF CORRECTION

Patent No. 3,585,602 Dated June 15th, 1971

Inventor(s) Wolf Herold

It is certified that error appears in the above-identified patent and that said Letters Patent are hereby corrected as shown below:

In the heading of the patent, line 11, change "P 18 04 870.9" to --P 18 04 815.2--. Column 1, line 15, change "date" to --data--; line 38, change "produce" to --product--. Column 2, line 2, after "include" change "the" to --code--. Column 3, line 33, change "FIG" to --FIGS--; line 37, change "shaft" to --shift--; line 62, after "inverting" insert --the--. Column 6, line 2, change "constitute" to --constitutes--.

Signed and sealed this 28th day of December 1971.

(SEAL)
Attest:

EDWARD M.FLETCHER,JR.
Attesting Officer

ROBERT GOTTSCHALK
Acting Commissioner of Patents